(12) United States Patent
Vijayendran et al.

(10) Patent No.: US 7,645,549 B2
(45) Date of Patent: Jan. 12, 2010

(54) READILY DEINKABLE TONERS

(75) Inventors: Bhima R. Vijayendran, Dublin, OH (US); Herman P. Benecke, Columbus, OH (US); Elizabeth Drotleff, Worthington, OH (US); Joel D. Elhard, Hilliard, OH (US); J. David Robbins, Worthington, OH (US); Jeffrey Cafmeyer, Columbus, OH (US); Joan Muellerleile, Bexley, OH (US)

(73) Assignee: Battelle Memorial Institute, Columbus, OH (US)

( * ) Notice: Subject to any disclaimer, the term of this patent is extended or adjusted under 35 U.S.C. 154(b) by 372 days.

(21) Appl. No.: 10/546,744

(22) PCT Filed: Feb. 27, 2004

(86) PCT No.: PCT/US2004/006023

§ 371 (c)(1),
(2), (4) Date: Jul. 18, 2006

(87) PCT Pub. No.: WO2004/077169

PCT Pub. Date: Sep. 10, 2004

(65) Prior Publication Data

US 2007/0015075 A1    Jan. 18, 2007

Related U.S. Application Data

(60) Provisional application No. 60/450,979, filed on Feb. 27, 2003.

(51) Int. Cl.
*G03G 9/087* (2006.01)

(52) U.S. Cl. ............... 430/108.1; 430/109.3; 430/137.1
(58) Field of Classification Search ............ 430/108.1, 430/109.3, 137.1
See application file for complete search history.

(56) References Cited

U.S. PATENT DOCUMENTS

| 3,738,832 | A | 6/1973 | Matsumoto et al. |
| 6,203,603 | B1 * | 3/2001 | Takayama et al. ......... 106/31.16 |
| 6,248,692 | B1 * | 6/2001 | Sano et al. .................. 503/205 |
| 2001/0018158 | A1 * | 8/2001 | Yoshida et al. .............. 430/125 |

FOREIGN PATENT DOCUMENTS

| JP | 51 124934 A | 10/1976 |
| JP | 58 176643 A | 1/1984 |
| JP | 59 182860 A | 10/1984 |

* cited by examiner

*Primary Examiner*—Hoa V Le
(74) *Attorney, Agent, or Firm*—Frost Brown Todd LLC

(57) ABSTRACT

Broadly the invention provides for a deinkable toner composition, an image made with the deinkable toner, and a method for making the toner including a coloring agent; a thermoplastic polymer; and a protein. In another embodiment the toner includes a coloring agent and a thermoplastic polymer where the protein has been incorporated into the polymer itself. In typical embodiments the protein is derived from soybeans but may be from other plant or animal sources. Typically the toner has a positive triboelectric charge of between about 10 to about 40 microCoulomb/g, or a negative triboelectric charge of between about 10 to about 40 microCoulomb/g.

25 Claims, 1 Drawing Sheet

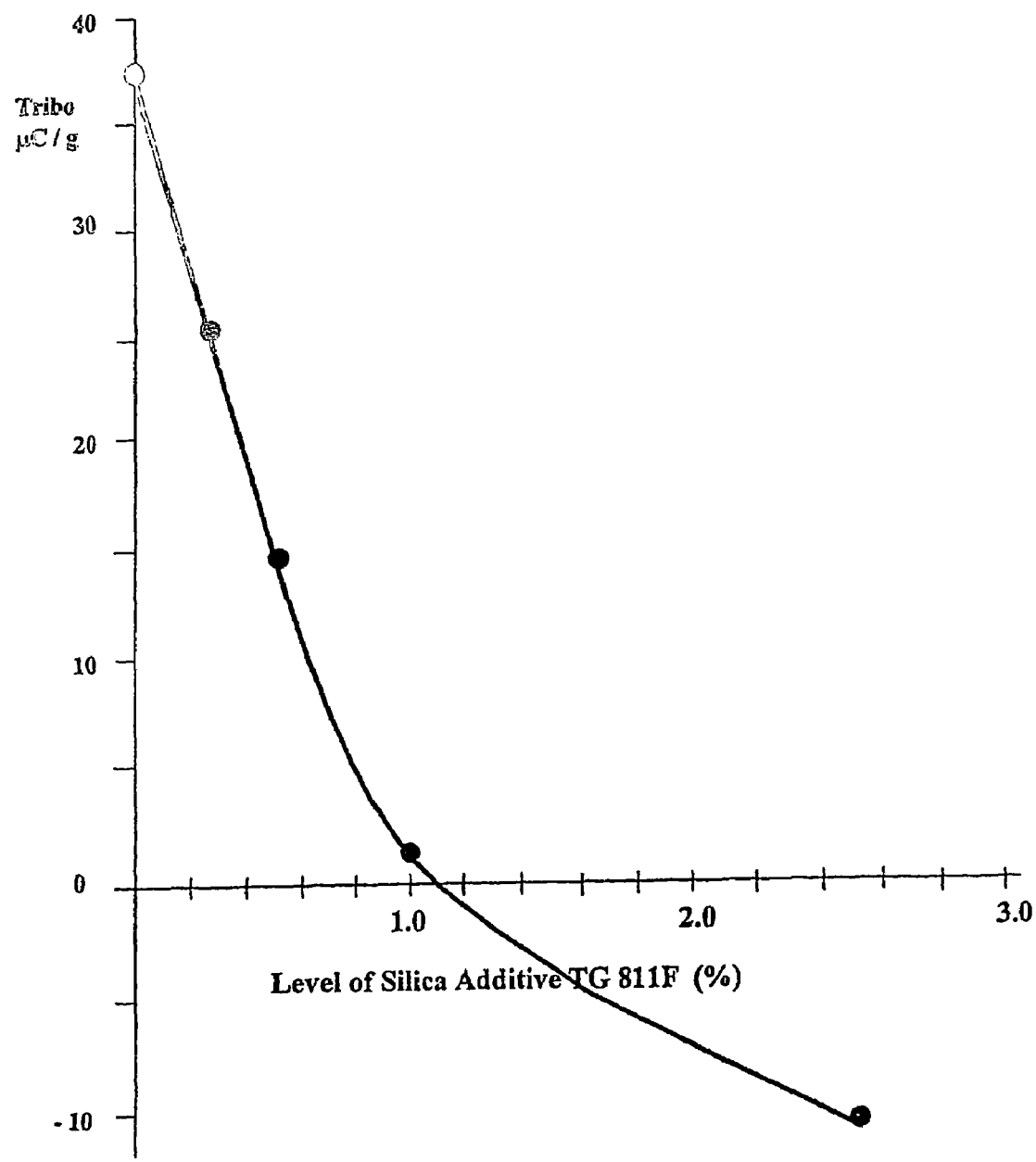

READILY DEINKABLE TONERS

This application claims priority to and the benefits of U.S. Provisional Application Ser. No. 60/450,979 filed Feb. 27, 2003.

The above provisional application is hereby incorporated by reference as if completely rewritten herein.

FIELD OF THE INVENTION

The present invention provides plant or animal based (e.g. soy-based) toners for use in office copiers, laser printers, and the like. The invention includes resin and toner compositions based on plant or animal oils and/or protein components.

BACKGROUND OF THE INVENTION

Briefly, there is a need to impart inherent "ready deinkabilty" feature to toners used in office copiers and laser printers. Current toners are not formulated with this feature, so in the manufacture of secondary fibers from office waste paper a considerable challenge is posed in removing toners from the printed surface. With a readily deinkable toner that has all the required toning and printing attributes similar to current toners, it should be possible to manufacture higher quality secondary fiber by conventional chemical deinking or emerging enzymatic deinking processes. Conventional toners are based on synthetic resins such as styrene acrylates, polyesters, polyamides, etc that are typically difficult to deink. Resins incorporating soybean derivatives including derivatives of the oils and/or proteins can have good toning and printing features like the current synthetic resin-based toners with significantly improved deinking features. Chemical structure and compositions of resins derived from soybean-based materials can be made more sensitive to attack by mild chemical deinking agents or enzymes. Toner work by others has shown that it is possible to make functional toners from soy dimer acids. However, their deinking features were marginal in a typical chemical deinking system and very poor in enzymatic systems.

BRIEF DESCRIPTION OF THE INVENTION

Broadly the invention provides for toner that has improved properties such as ready deinking characteristics. The toner is typically used in electrostatic type copying and printing machines.

A first embodiment of the invention provides for a toner including a coloring agent; a thermoplastic polymer; and a protein. Typically the protein is derived from animal or plant sources. Typically the toner comprises particles having a mean particle size range of less than about 100 micrometer and more preferably a mean particle size range of less than about 25 micrometer, and most preferably a mean particle size range of less than about 20 micrometer. Typically excipients selected from the group consisting of charge control agents, flow control agents, lubricants, anticaking agents, and mixtures thereof are used. In some typical embodiments the toner has a positive triboelectric charge of between about 10 to about 40 microCoulomb/g and more preferably a positive triboelectric charge of between about 10 to about 20 microCoulomb/g. In other typical embodiments, the toner has a negative triboelectric charge of between about 10 to about 40 microCoulomb/g and more preferably a negative triboelectric charge of between about 10 to about 20 microCoulomb/g. Some typical embodiments provide for a toner having a polymer glass transition temperature of between about 55° C. to about 70° C. In yet other typical embodiments the toner includes magnetic materials.

In broad embodiments of the invention the toner is used with printing and copying paper, in the graphic arts, and in textile printing.

In yet further embodiments of the invention, a method is provided for making a deinkable toner by the step of compounding a coloring agent; a thermoplastic polymer; and a protein. Typically the compounded deinkable toner is micronized and if needed classified for appropriate particle size distribution according to the application.

A yet further embodiment of the invention provides for an image prepared with a deinkable toner composition including a coloring agent; a thermoplastic polymer; and a protein. Typically the image density is from about 1.0 to about 1.3.

A further embodiment of the invention provides for a deinkable toner including a coloring agent; a thermoplastic polymer; and a protein. Typically the protein is derived from a soya bean.

A yet further embodiment of the invention includes a polyamide from the reaction product of a dimer acid; a diamine; a dibasic amino acid; and an aliphatic acid.

An additional embodiment of the invention includes a polyamide made by the reaction product of a dimer acid; a diamine; a protein derivative; and an aliphatic acid.

BRIEF DESCRIPTION OF THE DRAWING

The FIGURE is a graph showing the triboelectric charge on the Y axis in microCoulomb/gram versus the level of silica additive TG811 in % (by weight) on the X axis.

DETAILED DESCRIPTION OF THE INVENTION AND BEST MODE

The present invention provides soy-based toners for use in office copiers and laser printers. The examples provide for resin and toner compositions based on soybean oil and/or protein components that were synthesized and characterized establish ready deinkability. Selection of resin composition was based on various considerations such as glass transition temperature (Tg), mechanical and rheological properties and propensity to attack by deinking chemicals and enzymatic agents. Resins were characterized by melt rheology using a Rheometer, melting and Tg by DSC (Differential Scanning Calorimeter) and other relevant molecular and physical parameters. Formulates of 100-200 gram quantities of about 4-6 typical toner compositions using carbon black and flow additive using the resins. The toners were tested for particle size and distribution, triboelectric charge density, hand toning, melt rheology, and Tg. Copier tests were made to show printability and image quality of toners Subsequently further resin synthesis and toner formulations were made to prepare sufficient quantity of resin to formulate 300-400 grams of one to two toner compositions for more extensive testing and evaluation. Control toners were tested to establish base line performance of current products. The toners were tested in a commercial copier for a sufficient length of time to generate reasonable quantity of printed paper needed for deinking tests. Chemical deinking tests were performed to establish ready deinking features of toners prepared according to the invention.

Resin Synthesis

Soy-based dimer acid was chosen as one component for a more environmentally sound electrostatic toner based on some results reported by previous investigators. The dimer acid contains two carboxylic acid functionalities (see Formula 1) that can be reacted with diamines to produce polyamide bonds. Polyamide bonds are known to be susceptible to hydrolysis. Those based on a natural material, such as soybean oil, may be liable to attack via enzymatic means. Either of these methods of disintegration, hydrolysis or enzymatic degradation, should promote the removal of the resin from the paper surface, giving the toner good deinking properties. Other researchers reported that adding amino acids, such as tyrosine or glutamic acid, into the resin composition encourages swelling of the resin upon exposure to water. Increased swelling was expected to also improve the deinking properties of the resin.

employed to remove the water vapor produced during the condensation polymerization. After two hours, vacuum was applied, while keeping the temperature at 260° C., for an additional two hours.

Analytical tests were performed on samples of each resin to determine viscosity and glass transition temperature. Details about the composition were confirmed using infrared spectroscopy (IR) and nuclear magnetic resonance spectroscopy (NMR). Swelling measurements were carried out on select samples at pH 7 and pH 10, at 50C. A basic condition was chosen to see if higher pH was more effective in swelling the polymer than a neutral pH.

Fifteen different resin compositions were prepared (see Table 1 and Table 2 below). The initial resin composition

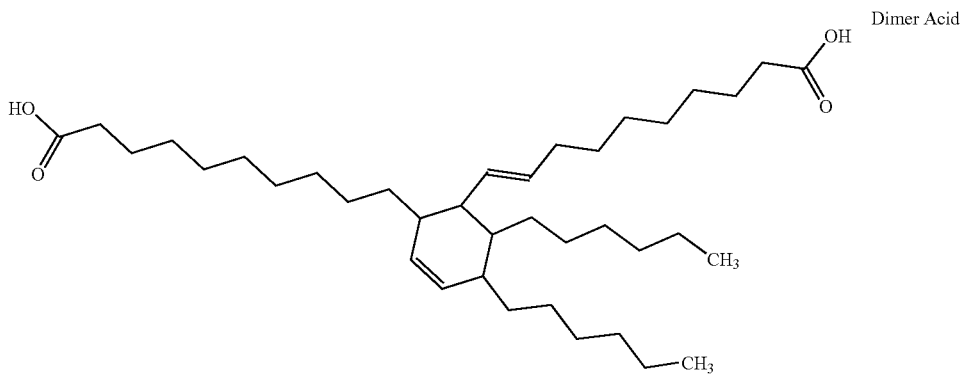

Formula 1. Dimer Acid

Examination of potential resin compositions using Quantitative Structure Property Relationship (QSPR) calculations resulted in possible resin formulations using the dimer acid reacted with one or a combination of diamines; phenylenediamine, PACM-20 (Air Products), and hexamethylenediamine, and either of two amino acids; (L)-tyrosine and (L)-glutamic acid. The dimer acid may vary from that depicted above to include about five —CH2- carbons groups less to about five carbon groups more on each of the amine arms and about three carbon groups less to about five carbon groups more on the hodroxylated arms, as well as a mixture of various dimer acids. A rigid diamine such as that represented by PACM-20 (bis(4-aminocyclohexyl)methane) is preferred and gives good properties. The dimer acid used herein was EMPOL-1018 (not hydrogenated) obtained from Cognis. Molecular modeling and experimental work showed that the combination of a diamine, a dimer acid, and an amino acid resulted in a resin that was too brittle. To minimize this problem, the C-6 diacid, adipic acid, was added. This molecule was expected to aid in imparting some toughness into the soy-based polymer. The model also predicted a lower glass transition temperature. A glass transition temperature in the range of 55-70° C. is well suited to the processing and performance of toners.

A preferred ratio for diamine/dimer acid is between 1 and 2. Most preferably between 1.8 and 1. The material obtained should have relatively lower degrees of polymerization compared to typical high polymers, more on the order of that found in oligomers.

Experimental protocol consisted of combining the components in a reaction flask equipped with an overhead stirrer, argon/vacuum inlet, and thermometer. The mixture was heated at 260° C. for two hours. A steady stream of argon was contained dimer acid, PACM-20, and (L)-tyrosine. However, under the reaction conditions, the (L)-tyrosine sublimed out of the reaction vessel. Infrared spectroscopy analysis indicated that no (L)-tyrosine was incorporated into the resin. This conclusion was supported by the thermal analysis data, which showed no change in the glass transition temperature (Tg) between this resin and the control (dimer acid and PACM-20 only). Because of the failure to incorporate (L)-tyrosine into the polymer, (L)-glutamic acid was used in all subsequent resin formulations. A similar problem was encountered when using phenylene-diamine and hexamethylenediamine as the diamine component. Each sublimed out of the reaction flask, thus upsetting the stoichiometry of the polymerization. PACM-20 was found to be a more suitable diamine, as it has a higher boiling point.

A resin that consisted of a 1.0:2.5:1.0:0.5 ratio of dimer acid, PACM-20, (L)-glutamic acid, and adipic add was chosen for initial tests of toner preparation and performance. The resin (34-8) had a Tg of 88.4° C. and a melt viscosity of around $3.7 \times 10^2$ P at 190° C. A toner was prepared using this resin, but problems were encountered due to the brittleness of the polymer. To alleviate this, soy protein isolate was blended with a second batch of the same resin. This batch of polyamide resin (50-17) had a lower Tg at 80.3° C. and a viscosity around $1.3 \times 10^2$ P at 190° C. The addition of the soy protein isolate raised the Tg slightly and also resulted in shear thinning versus shear-independent viscosity behavior (52-22). No previous resins had demonstrated this property. Another noticeable change caused by the addition of the soy protein was seen in the results of the swelling measurements. The resin itself only swelled 1-2% after three days at 50° C. in a water bath at both pH 7 and pH 10. The resin, with the incorporated protein, swelled 7% under the same conditions although this measurement was low since the sample had partially disintegrated in the water bath. It was anticipated that the breakdown of the polymer was a possible predictor of how readily the toner could be removed from paper.

Three batches of black toner were made using the resin blended with 20% soy protein isolate. The resulting paper copies were then tested for extent of deinking. A description of the toner preparation and the deinking tests along with a more detailed discussion of the results can be found in the subsequent sections of this report.

TABLE 1

Polyamide based Toner Resins

| Sample Number | Diamine | Amino Acid | Other Additive | Molar Ratio of Dimer Acid:Diamine:Amino Acid:Adipic Acid Additive |
|---|---|---|---|---|
| 4-22 | PACM-20 | Tyrosine | none | 0.5:1:1 |
| 6-24 | PACM-20 | none | none | 0.5:1 |
| 12-6 | Phenylenediamine | Glutamic Acid | none | 0.5:1:0.3 |
| 15-30 | PACM-20 | Glutamic Acid | none | 0.5:1:0.2 |
| 27-23 | PACM-20 | Glutamic Acid | Adipic Acid | 0.5:0.8:0.2:0.2 |
| 30-17 | PACM-20 | Glutamic Acid | Adipic Acid | 1:3:1:1 |
| 34-8 | PACM-20 | Glutamic Acid | Adipic Acid | 1:2.5:1.0:0.5 |
| 36-24 | PACM-20 | Glutamic Acid | Adipic Acid | 1.4:3.0:1:0.2 |
| 50-20 | PACM-20 | Glutamic Acid | Adipic Acid | 0.9:2:1.2:0.13 |
| 52-17 | repeat of 34-8 | | | |
| 52-22 (52-17 with Soy Protein Isolate | PACM-20 | Glutamic Acid | Adipic Acid + Blended Soy Protein Isolate | 1:2.5:1.0:0.5 + (blended soy protein isolate at 20% by weight) |
| 54-13 | hexamethylenediamine | Glutamic Acid | Adipic Acid | 1:2.5:1.0:0.5 |
| 56-19 | hexamethylenediamine and PACM-20 | Glutamic Acid | Adipic Acid | 0.5:0.63:0.63:0.5:0.25 |
| 63-10 | scale-up of 34-8 | | | |
| 65-20 | scale-up of 34-8 | | | |
| 67-6 | scale-up of 34-8 | | | |
| 70-14 | repeat of 34-8 | | | |
| 72-9 | repeat of 34-8 | | | |
| 74-10 | repeat of 34-8 | | | |
| 80-30 | PACM-20 | | | 1:1 |
| 81-31 | PACM-20 | | | 1.05:1 |
| 84-20 | PACM-20 | | | 1.25:1 |
| 91-5 | scale-up of 36-24 | | | 1.4:3:1:0.2 |
| 93-10 | scale-up of 36-24 | | | 1.4:3:1:0.2 |
| 95-6 | scale-up of 36-24 | | | 1.4:3:1:0.2 |
| 1-3-10 | scale-up of 36-24 | | | 1.4:3:1:0.2 |
| 1-4-29 | scale-up of 36-24 | | | 1.4:3:1:0.2 |
| 1-9-6 | scale-up of 36-24 | | | 1.4:3:1:0.2 |
| 1-12-7 | scale-up of 36-24 | | | 1.4:3:1:0.2 |
| 1-13-25 | scale-up of 36-24 | | | 1.4:3:1:0.2 |
| 1-17-1 | scale-up of 36-24 | | | 1.4:3:1:0.2 |
| 1-17-27 | scale-up of 36-24 | | | 1.4:3:1:0.2 |
| 1-20-19 | scale-up of 36-24 | | | 1.4:3:1:0.2 |

All Polyamide resins were made with dimer acids typically made from soybean oil. In the present case the dimer acid used was COGNIS-1018 (not hydrogenated). The dimer acid typically has two amino groups and two hydroxyl groups.

TABLE 2

Summary of Results of Polyamide Toner Resins

| Sample Number | Glass Transition Temperature (Tg) (° C.) | Approximate Viscosity (Poise) | Comments | Swelling Results (50° C. for 72 hrs.)/ % change in mass |
|---|---|---|---|---|
| 4-22 | 34.4 | NA | Amino acid sublimed | |
| 6-24 | 33.7 | NA | | pH 7 = 1.73<br>pH 10 = 4.57 |
| 12-6 | Inconclusive | NA | Diamine sublimed | |
| 15-30 | Inconclusive | NA | | |
| 27-23 | 75.2 | NA | | |
| 30-17 | 97.4 | $9.0 \times 10^3$ | | pH 7 = 2.36<br>pH 10 = 1.98 |
| 34-8 | 88.4 | $3.7 \times 10^2$ | | pH 7 = 2.07<br>pH 10 = 1.64 |
| 36-24 | 72.5 | $1.6 \times 10^2$ | | pH 7 = 1.53<br>pH 10 = 1.67 |

TABLE 2-continued

Summary of Results of Polyamide Toner Resins

| Sample Number | Glass Transition Temperature (Tg) (° C.) | Approximate Viscosity (Poise) | Comments | Swelling Results (50° C. for 72 hrs.)/ % change in mass |
|---|---|---|---|---|
| 50-20 | 80.9 | $1.0 \times 10^2$ | | |
| 52-17 | 80.3 | $1.3 \times 10^2$ | | |
| 52-22 | 82.8 | viscosity is a function of shear rate | | pH 7 = 7.6 (disintegrated) pH 10 = 8.3 |
| 54-13 | Inconclusive | $5.5 \times 10^2$ | Diamine sublimed | |
| 56-19 | Inconclusive | $1.0 \times 10^2$ | Diamine sublimed | pH 7 = 10.0 pH 10 = 5.0 |
| 63-10 | 80.2 | NA | | |
| 65-20 | 85.0 | $2.1 \times 10^2$ | | |
| 67-6 | 84.1 | $1.0 \times 10^2$ | | |
| 70-14 | 80.7 | $1.8 \times 10^2$ | | |
| 72-9 | 79 | $1.1 \times 10^2$ | | |
| 74-10 | 80.5 | $2.5 \times 10^2$ | | |
| 80-30 | 57.0 | | | |
| 81-31 | 45.9 | | | |
| 84-30 | 19.4 | | | |
| 91-5 | | | | |
| 93-10 | | | | |
| 95-6 | | | | |
| 1-3-10 | | | | |
| 1-4-29 | | | | |
| 1-9-6 | | | | |
| 1-12-7 | | | | |
| 1-13-25 | | | | |
| 1-17-1 | | | | |
| 1-17-27 | | | | |
| 1-20-19 | | | | |

Referring again to Table 2, it is noted that rheology data is typically represented by plotting viscosity versus shear rate. In the interest of time and space, an approximate value is reported for all samples that have a viscosity independent of the shear rate (thus, the graph is a relatively straight line.) The only sample where this is not true is the resin blend of 20% soy protein isolate (52-22). In this case, the viscosity is a function of the shear rate and therefore, cannot be expressed as a single value. The viscosities were measured at 190° C. on a Rheometrics SR5 apparatus. The materials were Newtonian over a shear rate range of $10^{-1}$ to $10^2$ reciprocal seconds. Swelling results were obtained by placing the toner into an aqueous buffered solution athe the specified pH for 72 hours at 50° C. The swelling results are reported as an increase in mass in weight %. Sample 52-22 having the protein isolate incorporated disintegrated under those conditions at a near neutral pH of about 7.6.

The 14 samples from 80-30 through 1-20-19 represent scale ups of material productions compared to the other samples. Scale up was by a factor of about 4.5.

Toner Preparation and Copier Evaluation

A Toshiba Model 1360, a small desktop copier with a copy output of 13 copies per minute, was used as a test copier for comparing results with conventional toners and the toners of the present invention. This copier uses an organic photoconductor with a two-component magnetic brush development system and requires a positive charging toner.

Determination of Developer System

An experimental developer system using 6% conventional toner on a Powdertech FBF-300 carrier was evaluated to confirm that this system could be used to produce images that were on par with the commercially purchased developer package for this copier. The test developer system gave a toner triboelectric charge of 13 microCoulomb/gm and produced copies that were subjectively judged to be equivalent to copies produced by the conventional developer system. Based on these results the standard for experimental developers system was 6% toner on FBF-300.

Preparation and Evaluation of Test Toners

Toner compositions were prepared based on soy polymers that would function in the Toshiba 1360 and could be used to produce copies (100 to 200 copies) for the deinking tests. There are a number of polymer properties that are critical for toner performance. However, since the purpose was to demonstrate that soy polymer-based toners provide improved deinking over conventional toners, three key properties were selected that are fundamental for short term toner performance to allow the preparation of a limited number of copies. The key properties that were focused on were:

Positive triboelectric charge with a target of 10 to 20 microCoulomb/gm. A positive triboelectric charge is required to produce a copy and image quality is affected by the magnitude of the charge.

Polymer glass transition temperature (Tg) with a target of 55° C. to 70° C. Acceptable fusing and blocking resistance (i.e. toner powder caking on storage) is strongly influenced by Tg.

Toner particle size and size distribution with a mean of 8 μm to 12 μm as the target with 95% in the range from 5 μm to 20 μm. Imaging performance and development life is affected by size and size distribution.

A basic toner composition of 10% carbon and 90% polymer was used. Other additives noted below may be included in typical toners to obtain desired toner performance:

Knowing the teachings of the invention, those skilled in the art are able to select additives and materials to obtain desired the charge properties.

Flow control agents—to provide good powder flow.

Surface Additives—typically lubricants to prevent toner offset to the fuser rolls, cleaning aids, triboelectric charging; toner flow and handling; e.g. Aerosil (R972), Titania (P25) to provides triboelectic charge stability, zinc stearate acts as a charge rate improver and as a blade cleaner lubricant; kynar (fluoropolymer)—as a lubricating additive.

Colorants—black, e.g. carbon black, magnetite, or a combination of both, highlight color, full color gamut; typical color pigments—cyan—substituted metallo phthalocyanines, Magenta—quinacridones, azonapthols, aminofluorenes (xanthenes), yellow, bisazo derivatives of diaminobiphenyl, monoazo compounds.

Bulk additives—fusing and release promoters, e.g. wax.

Magnetic additives—typically for toner containment, development properties, color, cleaning.

Conductive and nonconductive additives—typically added to control toner conductivity Charge Control Agents—added to provide the correct sign and magnitude of triboelectric charge; for controlled charging rate; fusing parameters and fuser life; e.g. higher styrene content in the thermoplastic polymer leads to more negative charging.

Typical thermoplastic polymers (and their monomers) useful with the invention include polyamides, polyesters, polyester ethers, styrene acrylates, polyurethanes, and mixtures thereof. As noted herein styrene copolymers with increased amounts of styrene may be useful for attaining negative charges. The materials provide enhanced properties when prepared according to the teachings of the invention.

Proteins useful with the invention may be derived from animal or plant sources such as soya protein, zein, collagen, casein, protein albumen, fish proteins and the like. The soy isolate proteins used herein typically had a protein content of about Mixture as used herein can be a collection of components or materials where they are substantially uniformly dispersed; typically since one ingredient is a thermoplastic polymer the components or materials are melt blended together.

Degree of polymerization—it has been found by tests herein that the best materials have a degree of polymerization that provides a solid toner material at room temperature yet processes easily and quickly at typical toner temperatures. The materials should flow easily onto paper or other substrate and adhere well upon being heated above their Tg. Typical degrees of polymerization include 5-50 units. The material should not be brittle so as to break up and produce unwanted flakes or dust.

The ratio of rigid diamine to dimer acid is preferably between 1 and 2 and most preferably between 1 and 1.8. Lower molecular weight materials are preferred that are in the polymerization range typically attributed to oligomers or lower molecular weight polymers. This provides materials having proper physical characteristics for toner performance.

In addition, blends of different molecular weight polymers may be used to provide the desired melt rheology for acceptable fusing behavior. In the examples herein the additives used were minimized; in general, fumed silica was added to aid in powder flow to achieve good magnetic brush formation. The basic toner composition used throughout was 90% resin and 10% carbon black. Regal 330, a typical carbon black used for electrophotographic toners, was used for all experimental toners.

Typical thermoplastic polyamides prepared according to the invention include those made from Dimer acid (e.g. EMPOL-1018);

Diamine (e.g. rigid diamine such as PACM-20 and the like);

Dibasic Amino Acid ((e.g. glutamic acid, aspartic add and the like); and

Aliphatic diacid (e.g. adipic add, melonic acid, glutaric acid, and the like).

In some typical applications the polyamide is obtained by reacting a protein isolate directly with the dimer acid, aliphatic add and diamine.

Preparation of Copies for Deinking Tests

Three separate groups of copies were tested for deinking properties.

First Sample Set for Deinking Evaluation

The initial set of copies for deinking was produced using the toner/developer systems shown in Table 3. This set included three experiment soy-based systems and two conventional controls. As this table shows, the image density of the experimental toners were all lower than that produced by the conventional developer/toner system (0.6 compared to 1.4). Since this image density difference could bias the deinking results the second conventional control was produced at a lower image density setting to obtain an image density (0.7) comparable to the copies produced from the experimental toner. These copies were produced the conventional carrier (FBF-300) was obtained and identified. For these evaluations, a experimental proprietary carrier and an conventional carrier that had been washed to remove the conventional toner were used. It was confirmed, by evaluating washed conventional carrier with conventional toner, (i.e. conventional toner was added to the washed conventional carrier and produced equivalent image quality to the original conventional system) that the function of the conventional carrier was not substantially affected by the washing procedure. None of the experimental toners shown in Table 3 were classified to obtain the narrow particle size distribution that is needed for optimal performance. As a result, the images produced had high background (i.e. toner deposited in non imager areas). As an additional control to assess the impact of toner background on the deinking result, the copies for sample E were made without an original document on the copier platen. This procedure allowed the production of copies with only background toner.

TABLE 3

First Sample Set for Deinking Evaluations

| | | | | Toner Composition (pbw)(2) | | | Developer System | | | |
|---|---|---|---|---|---|---|---|---|---|---|
| Sample ID | Toner ID | Soy Polymer ID(1) | Polymer Tg (° C.) | Polyamide resin | Procoat (soy Isolate) | Unirez2662 | Carrier | % Fumed Silica | Triboelectric charge μcoulombs/gm | Image Density |
| A | CON | — | | 0 | 0 | 0 | CON | 0 | 11 | 1.4 |
| A | CON | — | | 0 | 0 | 0 | CON | 0 | 11 | 0.7 |
| D | 48402-02-01 | 34-08 | 88 | 90 | 0 | 0 | XC-1283-51 | 0 | 29 | 0.6 |
| C | 48402-23-01 | 34-08 | 88 | 75 | 0 | 15 | Washed CON | 0 | 45 | 0.6 |
| B | 48402-36-01* | 52-17 | 80 | 72 | 18 | 0 | Washed CON | 2 | 39 | 0.7 |
| E | 48402-36-01* | 52-17 | 80 | 72 | 18 | 0 | Washed CON | 2 | 39 | — |

Note (1)
The reactant ratios for the soy based polyamide resin used were
Dimer acid - 33.3 pbw
PACM-20 (diamine) - 41.7 pbw
Glutamic acid - 16.7 pbw
Adipic acid - 8.3 pbw
This gives a molar ratio of 1:2.5:1.0:0.5 (dimer acid:PACM-20:glutamic acid:adipic acid).
(pbw) = parts by weight
CON = conventional
Note (2)
All experimental toners contained 10 pbw carbon black (Regal 330).
*Designated as soybean derived toner composed of polyamide resin and protein isolate.

Two approaches to improve deinking were explored with these experimental toners. The first approach is demonstrated by samples C and D. The toners used to produce these copies are based on using a soy polymer as a replacement for the typical toner polymer. Since the polyamide resin was very brittle, 15 pbw Unirez 2662 (commercial polyamide resin) was added to the toner formulation used for sample C in an attempt to obtain a tougher toner and reduce the fines generated during the grinding step. This did not work. The second approach is shown by sample B, which used a soy based polymer with soy isolate as an additive (designated as soybean derived toner). The concept with this approach was to create additional swelling of the toner particles due to the presence of the soy isolate. The bench top swelling tests confirmed significantly higher swelling due to the addition of the soy isolate.

The results of the deinking tests will be discussed below.

Second Sample Set for Deinking Evaluation

The second set of copies for deinking was produced using the toner/developer systems shown in Table 4. As this table shows, control copies produced using the conventional (CON) developer system were included with this set. The major goal of this work was to repeat and confirm improved deinking performance as a result of the addition of soy isolate. Sample B-1 is basically a repeat of sample B from the initial deinking tests. However, due to the relatively high Tg (84° C.) the copies were not well fused. As previously indicated, the preferred Tg for a toner polymer is in the range of 55° C. to 70° C. Before the deinking evaluation was carried out the copies were post fused. In addition, an experimental toner was prepared by melt blending soy isolate with the conventional toner. If the addition of soy isolate alone will provide improved deinking, then conventional toner manufacturers could potentially modify their existing toners to obtain improved deinking. Toner manufacturers would probably be more willing to consider this type of change; that is, a soy-based additive to improve deinking rather than the more complex change of the toner polymer. The experimental toners used for this set of evaluation were all classified to obtain a narrower particle size distribution that was a better approximation of the conventional toner.

TABLE 4

Second Sample Set for Deinking Evaluations

| | | | | Toner Composition (pbw)(2) | | | | | | | Particle Size | |
|---|---|---|---|---|---|---|---|---|---|---|---|---|
| Sample ID | Toner ID | Soy Resin ID(1) | Polymer Tg (° C.) | CON Toner | Polyamide | Procoat (soy Isolate) | Developer Carrier | Triboelectric charge μcoulombs/gm | Image Density | Mean (μm) | % 5-20 μm |
| C1 | CON | — | — | 0 | 0 | 0 | CON | 11 | 1.3 | 12 | 95 |
| B1 | 48402-52-01 | — | — | 72 | 0 | 18 | FBF-300 | 13 | 1.4 | 11 | 84 |
| A1 (3) | 48402-55-01 | 67-06 | 84 | 0 | 72 | 18 | FBF-300 | 10 | 1.0 | 10 | 79 |

Note (1)
The reactant ratios for the soy polymer used were:

TABLE 4-continued

Second Sample Set for Deinking Evaluations

| | | | Toner Composition (pbw)(2) | | | | | | Particle Size | |
|---|---|---|---|---|---|---|---|---|---|---|
| | | Soy | | | Procoat | | Triboelectric | | | |
| Sample ID | Toner ID | Resin ID(1) | Polymer Tg (° C.) | CON Toner | Polyamide | (soy Isolate) | Developer Carrier | charge μcoulombs/gm | Image Density | Mean (μm) | % 5-20 μm |

Dimer acid - 33.3 pbw
PACM-20 (diamine) 41.7 pbw
Glutamic acid - 16.7 pbw
Adipic acid - 8.3 pbw
This gives a molar ratio of 1:2.5:1.0:0.5 (dimer acid:PACM:glutamatic acid:adipic acid).
Note (2)
All experienced toners contained 10 pbw carbon black (Regal 330).
Note (3)
Post fused at 220° C. for 6 seconds.

Third Sample Set for Deinking Evaluation

The third set of copies for deinking was produced using the toner/developer systems shown in Table 5. Again the experimental toners were all classified to obtain a particle size distribution more typical of a commercial toner. However, the classification of toner 48402-64-01 used to produce the copies identified as D-2 was not very successful, as indicated by the low percentage (41%) of particles in the 5 to 20 μm range.

The purpose of this set of samples for deinking evaluation was to determine the impact of post fusing on the deinking results and evaluate the impact of a higher concentration of soy isolate in the conventional toner on deinking. As previously indicated the details of the deinking results will be presented in a later section.

Deinking Tests

This section summarizes results from deinking tests (Task 5) conducted at North Carolina State University under a confidentiality agreement.

The main objective of this task was to establish improved deinkability of prints made with soy toner compared to that of a regular toner using a laboratory chemical deinking procedure. Printed papers imaged with toners were pulped in a laboratory mixer using a standard surfactant. Pulped fibers were washed and further treated in a flotation cell to further remove toners separated from the printed-paper. Hand sheets were made with pulp before and after flotation process. Brightness and dirt count were measured to assess how well the toned images were deinked.

A typical deinking experiment and analysis of hand sheets is described below:

1. The samples (pieces about 5×5 cm) were soaked in the water (50° C.) for 10 min.
2. Sample was taken from the jar and put into a laboratory mixer (Waring Commercial, Model 47 BL84(CB6) Heavy Duty Blender).

TABLE 5

Third Sample Set For Deinking Evaluations

| | | | | Toner Composition (pbw)(2) | | | | | | Particle Size | |
|---|---|---|---|---|---|---|---|---|---|---|---|
| | | | | | | Procoat | | Triboelectric | | | |
| Sample ID | Toner ID | Soy Resin ID(1) | Polymer Tg (° C.) | CON Toner | Poly-amide | (soy isolate) | Developer Carrier | charge μcoulombs/gm | Image Density | Mean (μm) | % 5-20 μm |
| A2 | CON | — | — | 0 | 0 | 0 | CON | 11 | 1.3 | 12 | 95 |
| C2-(3) | CON | — | — | 0 | 0 | 0 | CON | 11 | 1.0 | 12 | 95 |
| D2 | 48402-64-01 | — | — | 62.5 | 0 | 37.5 | FBF-300 | na | 0.6 | 14 | 41 |
| B2 | 48402-67-01 | 70-14/72-09 | 80 | 0 | 72 | 18 | FBF-300 | na | 0.7 | 13 | 67 |
| E2-(4) | 48402-67-01 | 70-14/72-09 | 80 | 0 | 72 | 18 | FBF-300 | na | 0.5 | 13 | 67 |

Note (1)
The reactant ratios for the soy polymer used was:
Dimer acid - 33.3 pbw
PACM-20 (diamine) - 41.7 pbw
Glutamic acid - 16.7 pbw
Adipic acid - 8.3 pbw.
This gives a molar ratio of 1:2.5:1.0:0.5 (dimer acid:PACM-20:glutamic acid:adipic acid).
Note (2)
All experimental toners contained 10 pbw carbon black (Regal 330).
Note (3)
Reduced image density
Note (4)
Post fused at 220° C. for 6 seconds.

1. The repulping was done in the laboratory mixer @ a temperature of 50° C. at the lowest rpm.
2. Consistency was ca. 2.5%.
3. After 1 minute of repulping, the pH was adjusted with NaOH to the value of pH=10.0.
4. Under alkaline conditions the repulping was continued for 4 minutes.
5. The final temperature was 50° C., due to the heat generation of the agitation negating the heat loss to the surroundings.

Flotation
1. The flotation was performed in a laboratory-scale flotation cell (Adirondack, Formax™ Flotation Deinking Cell, 29.1 L) at a consistency of approximately 0.7%.
2. The temperature was adjusted with direct steam to 40° C. The slurry was circulated in the flotation cell at 57 L/min. The feed sample was taken.
3. Non-ionic surfactant was added (Lionsurf 729, 0.125% on dry solids) and the slurry was allowed to circulate for 5 minutes.
4. After 5 minutes of circulation, the air flow was opened with the rate of 225 L/min. The foam from the center of the flotation cell was collected and weighed.
5. After 10 min. of flotation, the air input was dosed and the accepts sample was taken.

Methods
1. Handsheets from slurry before and after flotation were made in accordance to TAPPI Standard T 205.
2. Brightness was measured in accordance to TAPPI Standard T 452.
3. Rejects were not diluted. The pads were formed by filtering the sample (ca., 75 mL) with a Buchner funnel (Whatman 42 Ashless Filter Paper).
4. The solids were determined by drying the samples in a laboratory CEM LabWave 900 microwave.
5. Image analysis was performed on an Apogee Spec*Scan 2000 analyzer with 600 dpi scanner (HP Scanjet 3C, Hewlett Packard). The threshold for detection was 120 and the smallest size detected was 0.01 mm². The smooth side (wire-side) of four sheets was used for each analysis.

The flotation process ran without problem. In general, the amount of rejects taken from the flotation, the consistency of the rejects, and the amount of foam was adequate and reasonably constant among all experiments. Good agreement between duplicate runs was achieved.

Flotation efficiency was defined as:

Flotation Efficiency=100%*(1-PPM Accepts/PPM Feed)

Brightness and image analysis are complimentary and the use of both enhances interpretation of the results. Brightness gain, which provides an indication of the removal of detached toner particles from the pulp, is a convenient and practical way to assess how well a toned image has been deinked.

Deinking Results

Results from the first sample set for deinking evaluations for details of the toner and resin composition) are shown in Tables 3 and 6. Major points worthy of note are:

Sample B hand sheets composed of pulped print paper made from polyamide (soy resin) and soy isolate (designated as soybean derived toner) based toner has a brightness value of 74.07-73.51 before flotation (designated as "Before" sample) and is quite comparable to Sample E (with a brightness value of 74.48-71.22) that had no image. This suggests that soybean derived toner is removed (deinked) quite readily by simple pulping even prior to flotation process. Other samples (A, A reduced, C and D) have "Before" brightness values in the 69.07-71.42 range prepared under the same conditions.

Samples C and D (see Tables 3 and 6) that have a higher glass transition temperature (88° C.) appear to have poorer deinkabilty, as measured by "Before"brightness values (69.07-70.63 vs. 74.07-73.51 for Sample B) of pulped sample prior to flotation compared to Sample B that has a glass transition temperature of 80° C. It appears polyamide with higher glass transition temperature has reduced deinkability after washing and pulping prior to flotation.

Brightness values after flotation show further improvement with all samples. However, the largest improvement is seen for Sample A (control toner at a print density of 1.4 0). This suggests that simple washing and pulping will not deink print images made with standard toners and a flotation process would be required to achieve adequate deinking. The highest brightness is seen with Sample B (Images made with soybean derived toner) amongst the other samples at a lower image density of 0.6-0.7.

Dirt count of pulp is quite low for Sample B similar to rest of the low image density samples compared to Sample A prior to flotation process. Rest of the data (rejects and solids in reject) is quite comparable in all the samples.

The above results suggest that toner according to the invention appears to be more readily deinkable than a conventional toner, as judged by its ease of removal from the printed copy paper by a simple pulping followed by washing process and not requiring the normal flotation step used in the deinking of regular electrostatic printed copy paper. The results are somewhat tentative due to the fact that the image density of prints made with soybean derived toner are less than what is typical of conventional toners. Further, brightness values noted for Sample B and control, even though appear to be real, do not differ by a large amount. A toner that has the easy deinkability as a built in feature like Sample B would offer significant cost savings in capital equipment and process costs in the production of secondary fibers from office copy papers.

Results from the second round of deinking tests are shown in Table 7. In this set of tests the objective was to check the reproducibility of ready deinkability noted with soybean derived toner after the images were post fused in an oven to make sure that the toner was fully melted and fixed in the paper (Sample A1). This test was performed as there was some concern that ready deinkabilty seen with Sample B in the first round of deinking study could be influenced by poor fusing of the toned image due to its slightly higher glass transition temperature. Further it was desired to evaluate if addition of soy protein isolate (Sample B1) to the control toner (Sample C1) would promote its ready deinkabilty.

Major findings from these examples were that there was a small but significant increase in "Before" brightness value of sheets made from washed and pulped copy paper prior to flotation in soybean derived toner Sample A1 (value of 72.41-71.86) compared to Control Toner C1 (value of 70.36-70.18) and soy isolate containing Control Toner B1 (value of 70.31-70.66). The lower brightness observed for Sample A1 (72.41-71.86) in this set compared to a value of 74.07-73.51 for Sample B in the first set data suggest that post fusing sample has fixed the toner more tightly, thus making its removal more difficult by washing and pulping. All the "Before" samples had lower brightness values than those seen in the first round of testing. Addition of soy isolate to the control toner does not appear to help in easier deinking of the control toner by simple washing and pulping. Brightness results of "Before" samples are encouraging as it confirms the finding from the first round of testing that soybean derived toner can be deinked by washing and pulping without having to use the expensive flotation process.

Third round of deinking tests were done to further confirm differences in deinking performance that had been observed with soybean derived toner in the previous two rounds of deinking tests. Results are shown in Table 8. Samples A2 and C2 correspond to control toners with normal image density and reduced image density. These two samples are repeat samples A and "A reduced" in Table 6 from the first round of testing.

Sample D2 has soy isolate at 37.5% loading in the control toner compared to the normal loading of 18% in "soybean derived toner designated as B2 and E2. Sample B2 corresponds to sample B of Table 6 from the first round of testing and Sample E2 corresponds to Sample A1 from Table 7 from second round of testing. Sample E2 represents normal soybean derived toner after post fusing.

Major findings worth noting are:

As observed in the first round of testing, normal soybean derived toners containing 18% soy isolate (Samples B2 and specifically E2) had the highest "Before" brightness values after washing and pulping prior to flotation and were better than the control toner at high image density (Sample A2). Control Toner (Sample C2) at reduced density had brightness values comparable to Sample B2 before flotation.

Sample E2 (soybean derived toner after fusing) showed the highest "Before" brightness value (73.8-75.47) and was better than the value obtained with "no post fusing" sample (Sample B2 with a value of 71.31-70.62). This result was not totally expected, as one would have expected reduced ease of deinkability with a post fused image. It is worth noting that glass transition of polyamides used in Sample B of the first set (Table 3) and Samples B2 and E2 of the third set (Table 5) were 80° C. and that of A1 used in the second set (Table 4) was slightly higher at 84° C.

All the samples showed further improvement in brightness after flotation.

TABLE 6

First Set Deinking Tests

LABORATORY FLOTATION
Pulp Brightness and Reject Data:

| Sample | Run # | PULP Brightness (° GE) Before | STDV | After | STDV | Gain (%) | PULP Image Analysis Results (PPM) Before | After | Rem. Eff.(%) | REJECT Weight (g) | Solids (%) | Solids (% of furnish) | Brightness (° GE) | STDV |
|---|---|---|---|---|---|---|---|---|---|---|---|---|---|---|
| A | 1 | 70.22 | 0.41 | 78.62 | 0.26 | 11.96 | 190 | 6 | 97 | 535.1 | 2.94 | 7.87 | 62.21 | 0.24 |
|  | 2 | 70.07 | 0.39 | 78.46 | 0.31 | 11.97 | 180 | 13 | 93 | 515.7 | 3.21 | 8.28 | 69.29 | 0.16 |
| B | 1 | 74.07 | 0.27 | 77.58 | 0.55 | 4.74 | 13 | 10 | 23 | 497.7 | 2.69 | 7.44 | 58.22 | 0.61 |
|  | 2 | 73.51 | 0.36 | 77.38 | 0.51 | 5.26 | 4 | 0 | 100 | 409.6 | 2.85 | 6.49 | 60.69 | 0.10 |
| C | 1 | 70.18 | 0.36 | 73.96 | 0.30 | 5.39 | 30 | 5 | 83 | 410.8 | 2.75 | 5.65 | 64.30 | 0.25 |
|  | 2 | 70.63 | 0.35 | 74.80 | 0.34 | 5.90 | 20 | 5 | 75 | 574.9 | 3.38 | 9.72 | 64.66 | 0.39 |
| D | 1 | 69.07 | 0.35 | 73.17 | 0.27 | 5.94 | 56 | 5 | 91 | 438.2 | 2.76 | 6.05 | 61.01 | 0.56 |
|  | 2 | 69.51 | 0.33 | 73.13 | 0.30 | 5.21 | 31 | 6 | 81 | 361.9 | 3.42 | 6.19 | 60.04 | 0.38 |
| E | 1 | 74.48 | 0.29 | 75.52 | 0.73 | 1.40 | 12 | 6 | 50 | 806.0 | 2.78 | 11.20 | 70.01 | 0.44 |
|  | 2 | 71.22 | 0.59 | 72.33 | 0.24 | 1.56 | 7 | 2 | 71 | 471.7 | 3.33 | 7.85 | 67.57 | 0.62 |
| A Reduced | 1 | 71.42 | 0.30 | 75.62 | 0.27 | 5.88 | 17 | 1 | 94 | 556.2 | 3.60 | 10.01 | 66.28 | 2.35 |
|  | 2 | 71.16 | 1.05 | 75.58 | 0.24 | 6.21 | 8 | 2 | 74 | 508.2 | 3.42 | 8.69 | 68.64 | 1.27 |

SOLIDS IN REJECT (%)

| Sample | Run # | Measurement 1 | 2 | AVRG |
|---|---|---|---|---|
| A | 1 | 2.93 | 2.94 | 2.94 |
|  | 2 | 3.22 | 3.19 | 3.21 |
| B | 1 | 2.68 | 2.70 | 2.69 |
|  | 2 | 2.84 | 2.86 | 2.85 |
| C | 1 | 2.73 | 2.76 | 2.75 |
|  | 2 | 3.35 | 3.41 | 3.38 |
| D | 1 | 2.77 | 2.75 | 2.76 |
|  | 2 | 3.42 | 3.41 | 3.42 |
| E | 1 | 2.79 | 2.76 | 2.78 |
|  | 2 | 3.33 | 3.33 | 3.33 |
| A Reduced | 1 | 3.22 | 3.98 | 3.60 |
|  | 2 | 3.28 | 3.55 | 3.42 |

NOTE:
Furnish per run = 200 g a.d. pulp (run "B" only 180 g a.d.)

TABLE 7

SECOND SET DEINKING TESTS*

LABORATORY FLOTATION
Furnish per run = 200 g a.d. pulp

| SAMPLE | RUN # | PULP Brightness (° GE) Before | STDV | After | STDV | Gain (%) | REJECT Weight (g) | Solids (%) | Solids (% of furnish) | Brightness (° GE) | STDV | Specific Brightness Gain (% per % of solids in reject) | Average |
|---|---|---|---|---|---|---|---|---|---|---|---|---|---|
| A1 | 1 | 71.86 | 0.95 | 74.94 | 0.31 | 4.29 | 765.1 | 3.06 | 11.71 | 66.41 | 1.01 | 0.366 | 0.340 |
|  | 2 | 72.41 | 0.96 | 75.21 | 0.15 | 3.87 | 779.5 | 3.17 | 12.36 | 66.44 | 0.79 | 0.313 |  |
| B1 | 1 | 70.31 | 0.50 | 75.04 | 1.09 | 6.73 | 620.0 | 3.16 | 10.88 | 58.07 | 0.81 | 0.618 | 0.700 |
|  | 2 | 70.66 | 0.43 | 77.03 | 0.21 | 9.02 | 847.3 | 2.45 | 11.53 | 60.66 | 0.41 | 0.782 |  |
| C1 | 1 | 70.36 | 0.25 | 77.41 | 0.21 | 10.02 | 846.6 | 3.16 | 13.38 | 63.05 | 0.37 | 0.749 | 0.718 |
|  | 2 | 70.18 | 0.25 | 77.40 | 0.22 | 10.29 | 984.6 | 3.04 | 14.97 | 65.16 | 0.79 | 0.687 |  |

| | | SOLIDS IN REJECT (%) | | | | | DIRT COUNT OF PULP (PPM) | | | |
|---|---|---|---|---|---|---|---|---|---|---|
| SAMPLE | RUN # | Measurement 1 | 2 | AVRG | | SAMPLE | RUN # | Before | After | Flotation Eff. % |
| A1 | 1 | 3.06 | 3.05 | 3.06 | | A1 | 1 | 89.10 | 12.70 | 85.7 |
|  | 2 | 3.18 | 3.15 | 3.17 | |  | 2 | 77.70 | 19.60 | 74.8 |
| B1 | 1 | 3.16 | 3.15 | 3.16 | | B1 | 1 | 1631.40 | 50.80 | 96.9 |
|  | 2 | 2.38 | 2.52 | 2.45 | |  | 2 | 1606.20 | 48.60 | 97.0 |
| C1 | 1 | 3.14 | 3.17 | 3.16 | | C1 | 1 | 135.50 | 5.50 | 95.9 |
|  | 2 | 3.02 | 3.05 | 3.04 | |  | 2 | 131.30 | 7.60 | 94.2 |

*Results from the three sets of deinking tests show that there is a definite tendency for the soybean derived toner to deink more readily after washing and pulping prior to flotation compared to the control toner used in the Toshiba copier. Actual degree of ready deinkability tendency of soybean derived toner, as measured by "Before" brightness value of hand sheets made with pulp after washing and pulping prior to flotation, appears to varyin the three deinking tests. Deinkabilty of soybean derived toner appear to depend on factors such as image density, post fusing of image, differences in the glass transition temperature of polyamide, particle size and classification of toners and inherent variability in the deinking test procedure. It would be very useful to evaluate some of these factors in a systematic study in a follow-on project to fully define and quantify these preliminarypromising results that show easier deinkability of office copy paper printed with soy toner like soybean derived toner.

TABLE 8

Third Set Deinking Tests

| Sample | Run | PULP Brightness (° GE) Before | STDV | After | STDV | Gain (%) | REJECT Weight (g) | Solids (%) | Solids (% of furnish) | Brightness (° GE) | STDV | Specific Brightness Gain (% per % of solids in reject) | Average |
|---|---|---|---|---|---|---|---|---|---|---|---|---|---|
| A2 | 1 | 68.20 | 0.53 | 76.65 | 0.30 | 12.39 | 490.2 | 1.44 | 3.53 | 41.64 | 0.41 | 3.51 | 3.22 |
|  | 2 | 67.60 | 0.80 | 76.94 | 0.35 | 13.82 | 467.8 | 2.01 | 4.70 | 44.98 | 1.26 | 2.94 |  |
| B2 | 1 | 71.31 | 0.39 | 75.97 | 0.59 | 6.53 | 460.3 | 1.96 | 5.01 | 58.53 | 0.31 | 1.30 | 1.44 |
|  | 2 | 70.62 | 0.58 | 75.48 | 0.80 | 6.88 | 488.2 | 1.60 | 4.34 | 60.37 | 1.65 | 1.59 |  |
| C2 | 1 | 71.49 | 0.62 | 78.59 | 0.52 | 9.93 | 434.3 | 2.19 | 4.76 | 59.59 | 1.08 | 2.09 | 2.05 |
|  | 2 | 72.96 | 0.79 | 78.77 | 0.47 | 7.96 | 458.1 | 1.73 | 3.96 | 56.76 | 1.54 | 2.01 |  |
| D2 | 1 | 70.46 | 0.38 | 74.39 | 0.67 | 5.58 | 430.6 | 2.26 | 5.41 | 55.72 | 2.61 | 1.03 | 1.14 |
|  | 2 | 69.59 | 0.62 | 74.52 | 0.68 | 7.08 | 499.4 | 2.04 | 5.66 | 60.80 | 2.43 | 1.25 |  |
| E2 | 1 | 73.80 | 0.90 | 77.06 | 0.45 | 4.42 | 481.8 | 2.26 | 6.05 | 61.97 | 0.32 | 0.73 | 0.52 |
|  | 2 | 75.47 | 0.56 | 76.92 | 0.49 | 1.92 | 691.4 | 1.65 | 6.34 | 64.32 | 0.57 | 0.30 |  |

| | | SOLIDS IN REJECT (%) | | | | | DIRT COUNT (PPM) | | | |
|---|---|---|---|---|---|---|---|---|---|---|
| Sample | Run # | Measurement 1 | 2 | Avrf | | Sample | Run # | Before | After | Flotation Efficiency % | Average |
| A2 | 1 | 1.43 | 1.45 | 1.44 | | A2 | 1 | 87.80 | 3.30 | 96.24 | 92.46 |
|  | 2 | 1.99 | 2.02 | 2.01 | |  | 2 | 134.20 | 15.20 | 88.67 |  |
| B2 | 1 | 1.96 | 1.96 | 1.96 | | B2 | 1 | 8.20 | 1.30 | 84.15 | 81.30 |
|  | 2 | 1.59 | 1.61 | 1.60 | |  | 2 | 13.00 | 2.80 | 78.46 |  |
| C2 | 1 | 2.20 | 2.18 | 2.19 | | C2 | 1 | 5.30 | 2.10 | 60.38 | 73.74 |
|  | 2 | 1.71 | 1.74 | 1.73 | |  | 2 | 9.30 | 1.20 | 87.10 |  |

TABLE 8-continued

Third Set Deinking Tests

| D2 | 1 | 2.26 | 2.25 | 2.26 | D2 | 1 | 28.50 | 3.60 | 87.37 | 91.25 |
|----|---|------|------|------|----|---|-------|------|-------|-------|
|    | 2 | 2.02 | 2.05 | 2.04 |    | 2 | 20.50 | 1.00 | 95.12 |       |
| E2 | 1 | 2.27 | 2.24 | 2.26 | E2 | 1 | 15.40 | 3.10 | 79.87 | 89.94 |
|    | 2 | 1.64 | 1.65 | 1.65 |    | 2 | 6.20  | 0.00 | 100.00|       |

The present invention does not require the deployment of a flotation process. Avoidance of the flotation step would have a significant cost savings estimated to be about 25% (both capital and operating) to a secondary fiber mill treating office waste paper. There could be added environmental benefit for a readily deinkable toner technology based on a renewable resource such as soybean.

Polyamides based on dimer acid and isolate appear to have desirable properties such as triboelectric charging, pigment compatibility, toughness for proper grinding and particle size classification and water swelling needed in a readily deinkable toner.

Electrostatic soybean derived toners based on polyamide derived from dimer acid and soy protein isolate perform well in a commercial Toshiba copier using a standard magnetic carrier. Copy quality of prints made with soybean derived toner, even though adequate, requires further improvement in image density.

Laboratory deinking tests show that copies made from soybean derived toners are more readily deinked in the washing and pulping process steps in a conventional flotation deinking process compared to the copies made from a conventional electrostatic toner used in a Toshiba Copier. Actual degree of ready deinkability of soybean derived toner appears to depend on factors such as image density, glass transition temperature of the toner resin, particle size of toner, and other operating parameters Laboratory deinking data suggests that there is a potential to eliminate or minimize the load on the capital intensive flotation process with plant and animal source derived toners.

The following sections 1 through 6 provide examples for the preparation and characterization of several toner formulations. One of the objectives of the examples in Sections 1 through 6 was to prepare negatively charged toner formulations. The samples prepared below confirmed procedures for positively charged materials that were prepared. In addition, the results provide guidance for obtaining negatively charged materials by to proper selection of negative charge control agents or by control of monomeric ingredients in forming the thermoplastic polymer (e.g. additional styrene units).

Section 1 Preparation of Several Toner Formulations

This section illustrates the formulation and preparation of colored (in these examples, black) "pseudo toners" based on combinations of soy-based polyester (synthesized according to the procedures described herein) and a soy based protein (Procote 200 from Dupont). For the examples herein these "pseudo toners" would then be converted into "working toners" using surface blended fumed silica surface additives.

Pseudo toners are defined as not fully formulated toners lacking additives typically added for "commercial or working toners" such as flow aids, the right level of control agents, anticaking agents and so on. Typical specifications for the working toners were derived from the Canon Optra C color toners used in the Lexmark Optra C color printer since this printer was used for tests.

Particle size: Mean D 50~8.5 μm
$D_{90}/D_{50}$=1.35 or better
$D_{50}/D_{10}$=1.35 or better Triboelectric charge properties: Q/M=~25 μC/gram Against a standard two component carrier silicone coated ferrite at 4% TC Q/M=~–10 to –12 μC/gram as measured directly off the aluminum developer roller of the Optra C developer cartridge The main reasons for choosing the Optra C cartridge as a test vehicle for toner were as follows: Toner samples for testing are relatively easy to introduce into this cartridge; the cartridge is relatively easy to clean up between toner samples under test; and the cartridges are readily available at low cost.

Experimental toners that meet the size and triboelectric charge specifications can be used in the cartridge in a Lexmark printer that has had its fuser disabled, so that unfused images of known mass per unit area can be prepared for testing of fusing parameters, such as minimum fixing temperature, hot offset temperature, and fusing latitude for various print speeds. The Lexmark Optra C printer is typical of modern color laser printers based on discharge area development and non-magnetic single component development physics. As such it uses negatively charging toner typical of modern laser printers and digital copiers.

First Pseudo Toner Prepared:

The First Toner Prepared was According to Formulation 1:

| | |
|---|---|
| Carbon Black (Regal 330) | 10.0 |
| Experimental Soy dimer acid polymer (a polyamide) | 71.75 |
| Soy Protein Dupont ProCote 200 | 17.25 |
| CCA Spilon TRH | 1.0 |
| TOTAL | 100.0 |

Note:
Spilon TRH is a powerful negative charge control additive added to the bulk of the toner. It is a black chromium azo complex.
Regal 330 is a commonly employed relatively neutral carbon black.

The toner was compounded in a single screw extruder and micronized in an Alpine air jet mill, and finally classified to the final particle size distribution using an elbow jet classifier. Yield of this toner was low due to multiple changes in melt blend and micronizer process conditions. Some difficulty was noted in getting a uniform blend of all components, however sufficient toner was accumulated to allow for a study of triboelectric charging behavior. However the mean particle size of the toner was 7.2 microns, lower than that specified. Particle size distribution was mainly within specifications The "pseudo toner" was mixed with the standard silicone coated ferrite carrier at 4% toner concentration on the carrier and rolled for 45 minutes to ensure equilibrium charge had been achieved. The toner charged very rapidly against this carrier. Triboelectric charge measurement showed that the toner had charged very positively against this carrier, which is specifically designed to charge toners negatively.

The value obtained was +35.7 µC/gram. This is a very high positive number considering the type of carrier used. Despite this result, the toner was surface treated by high shear blending with different levels of a negative charge directing fumed silica (Cabosil TG 811F), to study the effect of surface silica on the triboelectric charge behavior of the toner.

Triboelectric charge Q/M of toner+2% surface blended silica TG811F=−16.2 µC/g.

Triboelectric charge Q/M of toner+2.5% surface blended silica TG811F=−15.0 µC/g.

These results are the same within experimental error of the measurement, and show that at 2% surface additive, complete coverage of silica has been obtained, or at least there is no further value to adding more silica. Note that the target value of −25 µC/gram could not be achieved. Despite this fact, the toner was evaluated in an OptraC cartridge. Key functional parameters to achieve in the cartridge are the correct charge and powder flow properties, as well as the metered loading of toner on the aluminum development roller of the cartridge. The toner should charge to Q/M=−10 to −12 µC/g and have a mass per unit area of toner on the development roller M/A between 0.55 and 0.6 mg/cm$^2$.

The measured parameters were:

Q/M=−3 to −5 µC/g

M/A=0.25-0.30 mg/cm$^2$

In addition it was noted that the toner flowed too well (like water) and caused a lot of toner "dumping" and toner overflow from the cartridge. These symptoms are typically associated with insufficient triboelectric charge on the toner, wrong sign toner, inability of the metering blade to constrain the toner, and toner powder flow properties that are too good.

The low value of triboelectric charge may indicate excessive wrong sign toner or very low charge toner, as the Q/M value is an average charge of the toner.

Conclusion from First Toner Formulation

It was concluded that some ingredient of the toner is causing the toner to inherently charge very highly positive. It was suspected that this might be the ProCote 200 soy protein.

In addition it was concluded that with this particular formulation, addition of high levels of negative directing fumed silica could not overcome the underlying positive charge sufficiently to drive the overall charging of the toner to the desired level of ~25 µC/g.

Note: As a test of consistency with past results, a test of the triboelectric charge properties of the OEM Canon cyan toner was made.

The following results were obtained:

Triboelectric charge Q/M of OEM cyan toner at 4% TC on silicone coated ferrite carrier =−24.1 µC/g Triboelectric charge of OEM cyan toner on aluminum developer roller of Optra C cartridge=−12.5 µC/g Mass per unit area of OEM cyan toner on developer roller=0.55 mg/cm$^2$ These results are entirely consistent with previous experience of the OEM toner and its performance in the Optra C cartridge.

Second Set of Black Toners

The following illustrates the preparation of formulations goal and rationale behind the second set of formulations was to try to achieve a more neutral or slightly negative "pseudo toner" that could be tuned to −25 µC/g using much lower levels (<<1%) of fumed silica.

|  | Parts by weight |
| --- | --- |
| BLACK TONER Formulation 2 | |
| Carbon Black (Acidic type Raven 1255) | 10.0 |
| Experimental Soy dimer acid polymer | 70.00 |
| Soy Protein Dupont ProCote 200 | 17.00 |
| CCA Azo Spilon TRH | 3.0 |
| TOTAL | 100.0 |
| BLACK TONER Formulation 3 | |
| Carbon Black (Acidic type Raven 1255) | 10.0 |
| Experimental Soy dimer acid polymer | 78.5 |
| Soy Protein Dupont ProCote 200 | 8.5 |
| CCA Azo Spilon TRH | 3.0 |
| TOTAL | 100.0 |

In these formulations, the amount of negative charge control additive was increased from 1% to a practical maximum (3%) and the Regal 330 neutral carbon black was replaced with a much more negative acidic carbon black. In addition, in the Formulation 3 the amount of ProCote 200 was substantially reduced. These formulations were melt compounded and subjected to micronization and classification.

While micronizing the formulations a strange phenomenon was noted. Normally once the air flow, pressure and feed rate, and other micronization parameters are established, the toner exiting the system has a rather constant mean particle size. However, with these toners, it was found that the toner mean size continued to increase gradually, and the material remaining in the micronizer became very hard to grind. This suggests that the dispersion of one or more components in the toner is not good and that this component is much harder to grind than the bulk of the composition. The problem was more severe in Formulation 2 as opposed to Formulation 3, where there is less ProCote 200

Visually, the larger material was gray rather than black. It is believed that this material contains large particles of the ProCote 200 that have not been adequately and finely dispersed in the toner composition, and that do not contain the required amounts of carbon black or TRH.

The main material was classified to the required particle size. This time a mean particle size of 9 µm was obtained for both toners (compared to 7 µm for Toner Formulation 1).

Triboelectric charge and development properties of Toner Formulations 2 and 3 were determined. Triboelectric charge properties were measured as before for both toners at 4% TC on the standard silicone coated ferrite carrier.

Pseudo toner Formulation 2: Q/M=+27.1 µC/g

Pseudo toner Formulation 3: Q/M=+29.1, µC/g

Again it was noted that the toners charged very well and very fast against the carrier. No signs of toner dusting were observed, consistent with these high values of triboelectric charge.

Comparison with Formulation 1 shows that the triboelectric charging behavior of Pseudo toner Formulations 2 and 3 are not significantly different from each other or from Formulation 1 (Q/M=+35.7). Indeed these slightly lower values could be attributed solely to the difference in mean particle size of formulations 2 and 3.

Conclusions

It would appear that the usual effects of increased negative CCA and the use of a more negative carbon black have not overcome the intrinsic positive charging due to the toner resins.

Formulations 2 and 3 were then surface treated with 2% fumed silica TG 811F. The following results were obtained:

Formulation 2+2% Silica Q/M=−9.1 µC/g
Formulation 3+2% Silica Q/M=−9.0 µC/g

Again the desired value of −25 µC/g could not be obtained.

When roll milling these silica treated toners with the carrier, excessive toner dusting and clouding were noticed, indicating a lot of low charge or wrong sign toner, and instability.

The performance of these toners in the Optra C cartridges was not at all satisfactory. Excessive toner flow and very low charging levels (actually impossible to measure accurately) led to massive toner dumping and very poor surface coverage of the toner on the Optra C developer roller. Unfortunately these problems would make it impossible to try printing the toner in the Optra C printer, owing to very unstable conditions.

It is believed that the Procote 200, or possibly something in the Soy based polyester, is acting as a very effective Positive charge control agent. Formulating a toner without the ProCote 200 could prove this.

Section 2 Additional Toner Preparation
    Note: Toner 57 is Pseudo Toner Formulation 3

| BLACK TONER 3 | |
|---|---|
| Carbon Black (Acidic type Raven 1255) | 10.0 |
| Experimental Soy dimer acid polymer | 78.5 |
| Soy Protein Dupont ProCote 200 | 8.5 |
| CCA Azo Spilon TRH | 3.0 |
| TOTAL | 100.0 |

Toners 58A and 58B are Pseudo Toner Formulation 2

| BLACK TONER 2 | |
|---|---|
| | Parts by weight |
| Carbon Black (Acidic type Raven 1255) | 10.0 |
| Experimental Soy dimer acid polymer | 70.00 |
| Soy Protein Dupont ProCote 200 | 17.00 |
| CCA Azo Spilon TRH | 3.0 |
| TOTAL | 100.0 |

The differences in 58A and 58B are only minor variations in particle size distribution.

The triboelectric charge of Toner 57 and Toner 58B were retested using another standard silicone coated Cu Zn ferrite that had been used as a standard test material. This is the carrier labeled FCX 5706. This carrier is a little different in charging behavior to the silicone coated ferrite carrier used before FCX 5557, but only slightly. It is slightly less negative charging than the previous carrier, but only slightly. The new carrier FCX 5706 was used simply because more of it was available. It was noted that the silicone coated ferrite carriers are designed to charge toners negatively, not positively, but the soy based pseudo toners charge very positively against them.

Triboelectric Charging Results
Nominal Toner Concentration on carrier=4%
Roll time=45 minutes
Triboelectric charge measured in triplicate using standard Faraday cage Blow-off technique.
Faraday cage with 400 mesh screen (retains all particles above 38 microns)
Results are shown In Table 9 below.

TABLE 9

| TONER | Q/M Against Carrier FCX 5557 | Q/M Against Carrier FCX 5706 |
|---|---|---|
| 57 | +29.1 µC/g | +32.5 µC/g |
| 58B | +27.1 µC/g | +37.3 µC/g |

Recovery of toner in the blow-off experiments was acceptable, leading credence to the results. Typically between 3.5 and 3.7% toner was blown off (cf. 4.0% originally on carrier). No significant dusting (toner powder clouding) was observed during rolling in the bottle, indicating that the toner was charging well against the carrier.

Typical copiers where a positively charged toner is useful include the Xerox 10 series and Xerox 50 series light lens copiers; the Kodak (now Heidelberg Digital) 2085 copier and similar products (3100) that all use Kodak HX or IX toner. These products are all medium to high speed copiers.

It was decided to compare the Kodak HX developer for charging properties. The Kodak two component development unit is called SPD (stands for small particle development subsystem). It uses a permanently magnetized small size (~30 micron) Kynar coated Strontium ferrite carrier and employs a high working toner concentration of around 10%. The measured triboelectric charge of the HX toner in the HX developer gave a Q/M value of +15 µC/gram. Because of the small size carrier this Q/M measurement must be carried out on a special triboelectric charge measuring device called a MECCA device. A TC of 9.7% was obtained.

The HX toner at 10% TC was also measured against a similar kynar coated strontium ferrite carrier from PowderTech (FCX 6367) and obtained a value of +35.6 µC/gram, and a recovered TC of 9.8%

Using this same PowderTech carrier (FCX 6367) and using 10% TC of Toner Formulation 57 a very highly positive charging system was obtained, Q/M was +112 µC/gram, and a recovered TC of 7.3% was obtained. This again indicates the very highly positive charging nature of the soy-based toners. However, with appropriate formulation and judicious choice of toner surface additives and toner particle size, It appears possible to prepare a toner that would work in the Kodak copiers.

Section 3

It appears that the untreated toners 57 and 58 charged to a level of about +23 microCoulomb/g against the Toshiba carrier at 6% toner concentration. Also, these toners (57 and 58) charged to a level of about 23 microCoulomb/gram against the standard silicone coated ferrite carrier FCX 5706 at 3% toner concentration. This does not mean that the two different carriers have the same charging characteristics. They may, if there is no limiting number of charging sites on the carrier, i.e. there is no toner concentration dependence up to 6% toner concentration. However, there may be a toner concentration dependence if one or both of these carriers have a limited number of charging sites. In this case, it would be expected to see the triboelectric charge on the toner drop significantly as the toner concentration increases.

It appears that the results at 6% toner concentration with the carrier FBF-300, one needs to adjust the triboelectric charge of toners 57 and 58 downwards, from about +23 to around +13 microCoulomb/gram. Initially, the Cabosil TG 308F should be used to do this. Also 0.2% of the silica on the toner should be performed initially.

The silica is then blended at the highest speed of the kitchen blender for 2 times 30 seconds. That is 30 seconds on, followed by 30 seconds off, and followed by 30 seconds on. During the "off" stage lightly shake the vessel to make sure that no toner has stagnated somewhere in the vessel.

When determining the amount of toner to use in the blending, the mixing vessel to should be filled to about 40% of its volume. The toner is placed in the vessel first, followed by the fumed silica. When the vessel is filled to about 40% of its volume, this allows the necessary "vortex action" to occur when the blender is activated.

The triboelectric charge of the toner now treated with 0.2% silica is then measured, and assessed whether the triboelectric charge has dropped to about +13 microCoulomb/g. If it has not, these steps are repeated with larger amounts of the silica, until the desired level of +13 microCoulomb/g. has been achieved.

Section 4

Triboelectric charging properties of Toner No. 4 in the series of toners using the thermoplastic and protein based resins.

Toner formulation No. 4 has the following base formulation:

| BLACK TONER No. 4 | |
|---|---|
| | Parts by weight |
| Carbon Black (Acidic Raven 1255) | 10.0 |
| Experimental Soy dimer acid polymer | 88.00 |
| CCA Azo Spilon TRH | 2.0 |
| TOTAL | 100.0 |

Notes:
1. there is no soy protein ProCote 200 in this formulation.
2. Raven 1255 is a negative charging acidic carbon black.
3. Azo Spilon TRH is a black negative charge control agent.

The purpose of this formulation is to gain understanding of the fundamental charging characteristics of the soy dimer acid polymer. It was hypothesized that the high positive charging tendency of the previous mixed polymer toners was primarily due to the inclusion of the soy protein Pro-Cote 200 in the base formulations. Accordingly, this new formulation No. 4 was prepared in anticipation that it would not exhibit strong positive charging characteristics. As can be seen below, this was not the case.

Toner formulation No. 4 had the following particle size characteristics. The toner was ground (air jet milling) very smoothly and efficiently, with no change in particle size median during grinding. Subsequent particle size classification, also occurred efficiently, and a very narrow particle size distribution around a volume median of 8.0 micron was obtained.

$D50=8.0$ micron $D50/d10=1.28$ $D90/d50=1.25$

Triboelectric Charging Properties

In the following table, there is shown the measured triboelectric charge of the base (virgin) toner and toners prepared by blending several different levels of fumed silica onto the surface. The fumed silica used was one of the most inherently negative charging silicas supplied by Cabot Corporation, Cabosil TG 811F. Additive blending was performed in a Hamilton Beach 16 speed food blender (model No. 56200 at the highest speed setting for 2 times 30 seconds blending, with a 30 second rest in between blendings.

The triboelectric charge was measured against a standard silicone coated Copper Zinc ferrite carrier FCX 5706, supplied by PowderTech. This carrier is very similar in its charging properties to a previously used standard silicone coated carrier FCX 5557. These Silicone coated ferrite carriers are designed to charge toner negatively.

Toner was roll milled in a glass jar against the carrier at 4% toner concentration (96 parts carrier to 4 parts toner, by weight) in each case for 45 minutes. Triboelectric charge was measured using the standard blow off technique using a Faraday Cage manufactured by Torrey Pines Research. Values are an average of three blow-off measurements. See Table 10 below.

TABLE 10

| Toner Treatment | Triboelectric Charge μC/gram | % Recovery on blowoff | Comments |
|---|---|---|---|
| None (virgin toner) | +37.4 | 3.7% | Rapid charging, no dusting, small amount of free toner |
| 0.3% TG811F | +25.4 | 3.7% | Good charging, no dusting |
| 0.5% TG811F | +14.5 | 4.0% | Excellent charging, no dusting |
| 1.0% TG811F | +1.6 | 3.4% | Significant dusting and free toner Consistent with the low charge level |
| 2.5% TG811F | −10.8 | 3.15% | Significant dusting, and much free toner as indicated by the low recovery on blow-off. This is indicative of low charge toner and also probably some wrong sign toner. |

It was noted that Toner No. 4 charged inherently to a high positive charge. Addition of more and more of the negative silica resulted in a less positive toner. This is the expected result. It is also noted, however, that even with 1% silica the toner is still weakly positive. It is not possible to blend more than about 2.5% silica onto toner of this size without exceeding complete surface coverage. Although it is possible to drive the toner negative with this large amount of silica additive, this is not a practical solution, since much toner dusting (toner not associated with carrier) was observed, and this will lead to significant problems in machine use. In addition, it was not possible to drive the toner to the desired negative value of −25 µC/gram against this particular carrier. This is the target value for use of the toner in a typical Discharge Area Development system (DAD) used in modern printers and digital copiers.

The value of +37.5 µC/gram observed for the untreated virgin toner No. 4 (no surface additives) was very similar to the values obtained for toners 2 and 3 (coded 57 and 58B), which contain both the dimer acid polymer and the soy protein Pro-Cote 200. See Table 9 above This indicated that it is not the protein Pro-Cote 200 which is the inherent positive charging material, but, in fact, the dimer add polymer appears to be the major driver for positive charge.

Even though it was not possible to achieve the target charge of −25 µC/g against the carrier, another evaluation of the toner in an OptraC cartridge was made.

Key functional parameters to achieve in the cartridge are the correct charge and powder flow properties, as well as the metered loading of toner on the aluminum development roller of the cartridge.

The toner should charge to Q/M=−10 to −12 µC/g and have a mass per unit area of toner on the development roller M/A between 0.55 and 0.6 mg/cm².

The measured parameters were:

Q/M=−2 to −4 µC/g

M/A ~0.2 mg/cm²

In addition it was noted that the toner flowed too well (like water) and caused excessive toner "dumping" and toner overflow from the cartridge. These symptoms are typically associated with insufficient triboelectric charge on the toner, wrong sign toner, and inability of the metering blade to constrain the toner, and toner powder flow properties that are too good. The low value of triboelectric charge may also indicate excessive wrong sign toner or very low charge toner, as the Q/M value is an average charge of the toner The dimer acid polymer appears to be the predominant driver towards the positive triboelectric charging behavior of toners based on the two Soy-based polymers.

It is not possible to overcome these highly positive charging characteristics by the usual toner formulation methods, namely the use of internal negative charge control additives, and surface treatments with negative charging fumed silica. This infers that this particular resin system will not be useful for typical negative charging toner designs (DAD systems), but is useful for positive toner designs, such as those exemplified by the Kyocera type toners. On the other hand, selection of appropriate materials in preparation of the thermoplastic polymers such as styrene and others known in the art can be used to reduce positive charges.

Section 5

This section illustrates triboelectric charge results on Toshiba Type Developer (Toshiba Type Carrier and Toshiba type toner mixture. The triboelectric charge on the Toshiba type toner using the small sample of developer was measured. The sample was roll-milled for 10 minutes in order to establish good charging, and then measured using the TPR blow-off triboelectric charge technique.

The sample was measured in triplicate and the results were in good agreement and were averaged: q/M=+15.8 µCoulombs/gram. Blow-off recovery of toner indicated a toner concentration on the carrier of 5.8%. No toner dusting was observed, indicating uniform charging of the toner.

Samples of toners and developers were prepared as follows:

(a). Toner No. 4 750 grams (this is the toner based on the dimer acid polyester only, with no Pro-cote 200 in the formulation.

(b). 60 grams Toner No. 4 surface treated with 0.3% Cabosil fused silica TG811F (c). 60 grams Toner No. 4 surface treated with 0.5% Cabosil fused silica TG811F (d). 60 grams Toner No. 4 surface treated with 1.0% Cabosil fused silica TG811F (e). 60 grams Toner No. 4 surface treated with 2.5% Cabosil fused silica TG811F The triboelectric charge results obtained with these toner samples (a) through (e) roll-milled at 4% TC against the standard silicone coated Cu—Zn ferrite FCX 5706 are listed below and Table 10.

(a). +37.4 µC/g
(b). +25.4 µC/g
(c). +14.5 µC/g
(d). +1.6 µC/g
(e). −10.8 µC/g

About 8 grams of each of the developers, containing these toners (a) through (e) were prepared.

It is suggested to shake or roll-mill the developers for a few minutes before measuring the blow-off triboelectric charge.

Using the 60 gram samples of surface treated toners, equilibration of these toners with the Toshiba carrier, at 6% Toner Concentration, for 30-45 minutes and measurement of the triboelectric charge on the toners should give the same trend in charging as observed above.

It is preferred to take the precaution of breaking down these aggregates by pre-grinding the silica (as received) in a small electric coffee grinder, which can be obtained from a department store (such as a Braun coffee grinder from Sears etc).

It appears that the dimer acid polymer derived from soya beans is the main material responsible for directing the toners to an extremely high positive charge. The material appears useful in magnetic SCD type toners that will function In Kyocera Ecosys type printer cartridges. These type of toners are required to charge quite positively.

Section 6

The Kyocera toners are exemplary of positively charging toners used in DAD printers, since they employ the amorphous silicon photoreceptor, which is a positively charged photoreceptor drum, in contrast to the much more common negatively charged "Organic photoconductor" or "OPC" drums used in most other printers and copiers, and which use negatively charged toners.

The Kyocera toners are also magnetic single component development toners, appearing to employ about 40% black magnetite as the colorant.

Toner Formulation

The following base toner formulation was prepared:

| Ingredient | % by weight |
| --- | --- |
| Toda magnetite | 40 |
| Shamrock Wax PP CP40 | 6 |
| Total resin mixture | 54 |
| Charge Control Agent | NONE |

Note 1: The resin mixture consists of the resins prepared as disclosed herein at a ratio 95 parts by weight of the dimer acid polymer to 5 parts by weight of the soy isolate protein, this gives a protein content of approximately 3% in the toner.
Note 2: No positive charge control additive was used in this experimental toner, based mainly on the fact that very high positive charging of previous carbon black experimental toners based on the polyamide resins had been observed.

The amount of wax from 3% used in a Kyocera type toner to 6% in this experimental toner, due to the propensity for Hot Offset, that might be observed due to the very low melt behavior that was observed for the resin mixture in Shimadzu flow test experiments carried out 180° C. (the approximate set point fuser roll temperature of a Kyocera printer). It was expected that the increased amount of wax would to some extent increase the fusing latitude of the experimental toner. However, as will be mentioned later, significant Hot Offset was observed during print runs with the experimental toner.

The formulation outlined above was melt blended with no problems. The material was then jetted and classified with no problems and in good yield with very good control of the targeted particle size and the particle size distribution. The volume mean particle size of the experimental soy based toner was 7.3 microns The volume mean particle size of the standard Kyocera toner was 7.9 microns.

The targeted triboelectric charge for the Kyocera type toner is q/M=+13–+14 μC/g against a standard carrier. A positive charge control agent can be incorporated into the base toner, to give a positive charge (e.g. of about +20 μC/g), then by using negative directing surface additives to bring the charge down.

The triboelectric charge of the base experimental toner was measured as +9 μC/g, and this was raised slightly to +11 μC/g through the use of a positive directing silica. The silica was needed to significantly improve the powder flow properties of the toner in order that print tests could be performed.

NOTE: With hindsight, it appears that it would have been better to incorporate some positive charge control agent in the experimental toner in order to obtain a more positive charge.

Both the experimental Soy based toner (with surface additives) and the Kyocera type toner (with surface additives) were used to run 500 print tests, in order to collect sufficient prints for a paper repulping/recycling test. The results of the print tests were not entirely satisfactory. The Kyocera type toner produced high image density prints with no background and no fading of image density on running 500 consecutive prints. The polyamide resin-based toner printed with fair density initially, but faded considerably over 500 prints. It appears this is because the triboelectric charge level and powder flow properties were not exactly meeting the printer specifications. In addition, as anticipated the polyamide resin-based toner exhibited severe Hot Off setting properties due to the low melt/narrow fusing latitude behavior of the toner. However 500 prints from each toner were prepared.

It appears that by appropriately tuning the molecular weight distribution of the resins; the problems with fusing latitude can be alleviated. The problem was particularly severe here because of the relatively high set point temperature in the particular Kyocera printer used.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. A deinkable toner comprising a mixture of:
   a. a coloring agent;
   b. a thermoplastic polymer made using a soy-based dimer acid; and
   c. a protein.
2. The toner according to claim 1 wherein said protein comprises a soya bean derived protein.
3. The toner according to claim 1, wherein said toner comprises particles that have a mean particle size of less than about 100 micrometers.
4. The toner according to claim 3, wherein said toner comprises particles that have a mean particle size of less than about 20 micrometers.
5. The toner according to claim 1, wherein said toner comprises a magnetic material.
6. The toner according to claim 1, additionally comprising:
   d. excipients selected from the group consisting of charge control agents, flow control agents, lubricants, anticaking agents, and mixtures thereof.
7. The toner according to claim 1, wherein said toner has a positive triboelectric charge of between about 10 to about 40 microCoulomb/g.
8. The toner according to claim 7, wherein said toner has a positive triboelectric charge of between about 10 to about 20 microCoulomb/g.
9. The toner according to claim 1, wherein said toner has a negative triboelectric charge of between about 10 to about 40 microCoulomb/g.
10. The toner according to claim 9, wherein said toner has a negative triboelectric charge of between about 10 to about 20 microCoulomb/g.
11. The toner according to claim 1, wherein said toner has a polymer glass transition temperature of between about 55° C. to about 70° C.
12. The toner according to claim 1, wherein said thermoplastic polymer is made using a rigid diamine.
13. The toner according to claim 1, wherein said thermoplastic polymer is made using a dibasic amino acid selected from the group consisting of glutamic acid, aspartic acid, and mixtures thereof.
14. The toner according to claim 1, wherein said thermoplastic is a polyamide.
15. The toner according to claim 1, wherein said thermoplastic is a polystyrene acrylate.
16. The toner according to claim 1, wherein said thermoplastic is a polyester.
17. The toner according to claim 1, wherein said thermoplastic is a polyester ether.
18. The toner according to claim 1, wherein said thermoplastic is a polyurethane.
19. A method for making a deinkable toner comprising mixing and compounding:
   a. a coloring agent;
   b. a thermoplastic polymer made using a soy-based dimer acid;
   c. a protein; and
   d. micronizing the compounded mixture.
20. The method according to claim 19, wherein said method includes a protein derived from soya beans.

21. The method according to claim 19, wherein said method comprises compounding a magnetic material.

22. An image prepared with a deinkable toner composition comprising a micronized mixture of:
   a. a coloring agent;
   b. a thermoplastic polymer made using a soy-based dimer acid; and
   c. a protein.

23. The image according to claim 22, wherein the image density is about 1.0 to about 1.3.

24. The image according to claim 22, wherein said image comprises a soya bean derived protein.

25. The image according to claim 22, wherein said image comprises a magnetic material.

* * * * *

UNITED STATES PATENT AND TRADEMARK OFFICE
CERTIFICATE OF CORRECTION

PATENT NO. : 7,645,549 B2
APPLICATION NO. : 10/546744
DATED : January 12, 2010
INVENTOR(S) : Bhima R. Vijayendran et al.

Page 1 of 1

It is certified that error appears in the above-identified patent and that said Letters Patent is hereby corrected as shown below:

COLUMN 3 and 4, line 15 replace formula 1 with the formula below:

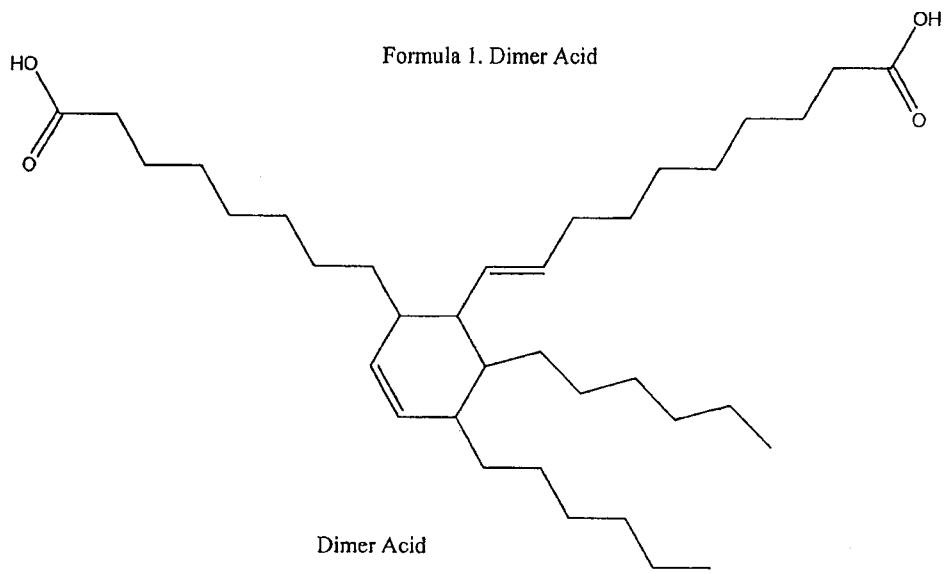

Formula 1. Dimer Acid

Dimer Acid

COLUMN 3

Line 42, change "—CH2-" to -- -$CH_2$- --.

Line 43, change "amine" to --alkyl--.

Line 45, change "hodroxylated" to --carboxylic acid--.

COLUMN 5 and 6, amend the paragraph located below Table 1

Change "amino groups and two hydroxyl groups." to --carboxylic acid groups--.

Signed and Sealed this
Nineteenth Day of July, 2011

David J. Kappos
*Director of the United States Patent and Trademark Office*